United States Patent [19]

Pasquini

[11] Patent Number: 4,681,340

[45] Date of Patent: Jul. 21, 1987

[54] CHILD'S FOLDING PUSHCHAIR

[75] Inventor: Henri Pasquini, Cholet, France

[73] Assignee: Ampafrance, S.A., Boulogne-Billancourt, France

[21] Appl. No.: 759,732

[22] Filed: Jul. 29, 1985

[30] Foreign Application Priority Data

Aug. 6, 1984 [FR] France .................. 84 12419

[51] Int. Cl.⁴ ............................................... B62B 7/06
[52] U.S. Cl. .................................. 280/642; 280/647; 280/658
[58] Field of Search ............... 280/642, 643, 644, 647, 280/648, 649, 650, 658, 87.02 W, 47.38, 47.41

[56] References Cited

U.S. PATENT DOCUMENTS 4,412,689 11/1983 Lee .................................. 280/648
4,428,598 1/1984 Kassai .............................. 280/644

FOREIGN PATENT DOCUMENTS 2293350 7/1976 France .
2510060 1/1983 France .
2033309 5/1980 United Kingdom .

Primary Examiner—John J. Love
Assistant Examiner—Richard Camby
Attorney, Agent, or Firm—Sandler & Greenblum

[57] ABSTRACT

The seat unit of a folding pushchair comprises a frame which is provided on each side, on the one hand with a seat-back side member swingably supported at the lower end thereof by the particular rear wheel-strut and stiffening link-rod which is pivotally attached to the lower end of the main supporting arm and, on the other hand, with a connecting-rod pivotally attached to one end to the seat-back side member and at the other end to the upper end of the front wheel-strut. For the purpose of folding the pushchair, the structural design is such as to ensure that, when the main supporting arm and the front wheel-strut withdraw in sliding motion and the rear wheel-strut is swung back against said arm and strut under the tractive force applied by the stiffening link-rod, the seat-back side member and the connecting-rod also return to the folded-back position.

10 Claims, 5 Drawing Figures

CHILD'S FOLDING PUSHCHAIR

BACKGROUND OF THE INVENTION

1. Field of the Invention

The present invention relates to folding pushchairs (or so-called "strollers") for children.

2. Description of the Prior Art

In accordance with known practice, a child's pushchair comprises a frame for supporting a seat unit which can usually be set at different angles of slope.

The frame is formed by two lateral frame assemblies which are interconnected transversely by means of at least one bracing cross-member.

For the purpose of folding the pushchair, each lateral frame assembly can be completely folded-back. The folding operation is performed by collapsing the pushchair either to a flat state, in which case the bracing cross-member is non-deformable, or to the state of a bundle, in which case the bracing cross-member is deformable.

SUMMARY OF THE INVENTION

Although other applications may be contemplated, the invention is primarily applicable to pushchairs of the flat-state folding type.

In accordance with a further aspect, the invention also applies to pushchairs in which each lateral frame assembly is folded-back by displacing a main supporting arm in a sliding movement with respect to a front wheel-strut which forms a supporting-arm extension and by causing a rear wheel-strut to swing back against the main supporting arm and front wheel-strut which have thus been withdrawn. In this type of pushchair, the front wheel-strut and the main supporting arm are coupled by stiffening means which permit a relative sliding movement of these latter. The rear wheel-strut is pivotally attached to one element consisting of a main supporting arm and front wheel-strut and is coupled to the other element by means of a stiffening link-rod.

In a pushchair of this type, the invention is directed to a novel arrangement of the seat unit and to the means adopted for coupling said seat unit with the lateral frame assembly in order to permit folding of the pushchair to a highly compact state in which the overall dimensions of the pushchair are reduced to a minimum.

With this objective, the child's folding pushchair in accordance with the invention, comprising two lateral frame assemblies connected to each other by means of at least one bracing crossbar, each lateral frame assembly being constituted by a main supporting arm whose lower front end-portion is adapted to carry a front strut for carrying at least one front wheel or the like and a rear strut for carrying at least one rear wheel or the like. The main supporting arm and the front wheel-strut are slidably coupled to each other and the rear wheel-strut is pivotally attached at the upper end to one of said main supporting arms and front wheel-struts. The ends of a stiffening link-rod are pivotally attached to the other main supporting arm and front wheel-strut and to the rear wheel-strut, a seat unit being carried by each lateral frame assembly. The lateral frame assemblies are deformable for the purpose of folding by withdrawal of the main supporting arm and front wheel-strut in relative sliding motion and by causing the rear wheel-strut to swing back against the main supporting arm and the front wheel-strut. The invention is distinguished by the fact that the seat unit comprises a frame which is provided on each side, on the one hand with a seat-back side member swingably supported at the lower end thereof by the particular rear wheel-strut and stiffening link-rod which is pivotally attached to the lower end of the main supporting arm and, on the other hand, with a connecting-rod pivotally attached at one end to the seat-back side member and at the other end to the upper end of the front wheel-strut. The structural assembly is so designed as to ensure for the purpose of folding the pushchair that, when the main supporting arm and the front wheel-strut withdraw in sliding motion and the rear wheel-strut is swung back against said arm and wheel-strut under the tractive force applied by the stiffening link-rod, the seat-back side member and the connecting-rod also return to the folded-back position.

As an advantageous feature, the lower end of the seat-back side member is slidably fitted on the rear wheel-strut or the stiffening link-rod in such a manner as to permit adjustment of the angular position of the seat unit. To this end, recessed abutment means can be provided for receiving the lower end of the seat-back side member.

The frame of the seat unit can be completed by a front side-member which extends in front of the lateral frame assembly and which is pivotally attached at the rear end thereof to the upper end of the front wheel-strut. Said front side-member is preferably provided with locking means adapted to cooperate with complementary locking means carried by the main supporting arm for locking the lateral frame assembly in the unfolded position, said locking means being released by displacement of the front side-member in a swinging movement carried out preferably in the upward direction for the purpose of folding the pushchair. Said locking means can be constituted by a notch formed in the bottom edge of the front side-member at a predetermined distance from its axis of articulation, and by a transverse stud carried by the lower end of the main supporting arm and adapted to be received by said notch in the unfolded position of the pushchair.

The seat-back side member and the front side-member are adapted to carry a hammock-type element having two openings through which a child's legs are intended to pass.

In the application to flat-state folding pushchairs, the seat-back side members and the front side-members of the two lateral frame assemblies are connected at their free ends respectively by means of a rear crossbar and by a front crossbar, each crossbar together with the associated pair of side members being intended to form a hoop for supporting the hammock-type seat element. In this application, the main supporting arms, the front wheel-struts and the rear wheel-struts are connected together in pairs by means of stationary cross-members.

In a first embodiment, the lower end of the seat-back side member is carried by the stiffening link-rod whose upper end is pivotally attached to the lower end of the main supporting arm whilst the rear wheel-strut is pivotally attached to the upper end of the front wheel-strut, the assembly being such that the folding operation takes place in a movement of relative inward displacement of the front and rear wheels.

In another embodiment, the lower end of the seat-back side member is carried by the rear wheel-strut whose front upper end is pivotally attached to the lower end of the main supporting arm whilst the stiffening link-rod is pivotally attached to the upper end of the front wheel-strut, the assembly being such that the folding operation takes place in a movement of relative outward displacement of the front and rear wheels.

BRIEF DESCRIPTION OF THE DRAWINGS

These and other features of the invention will be more apparent upon consideration of the following description and accompanying drawings, wherein.

DESCRIPTION OF THE PREFERRED EMBODIMENTS

Figure 1:
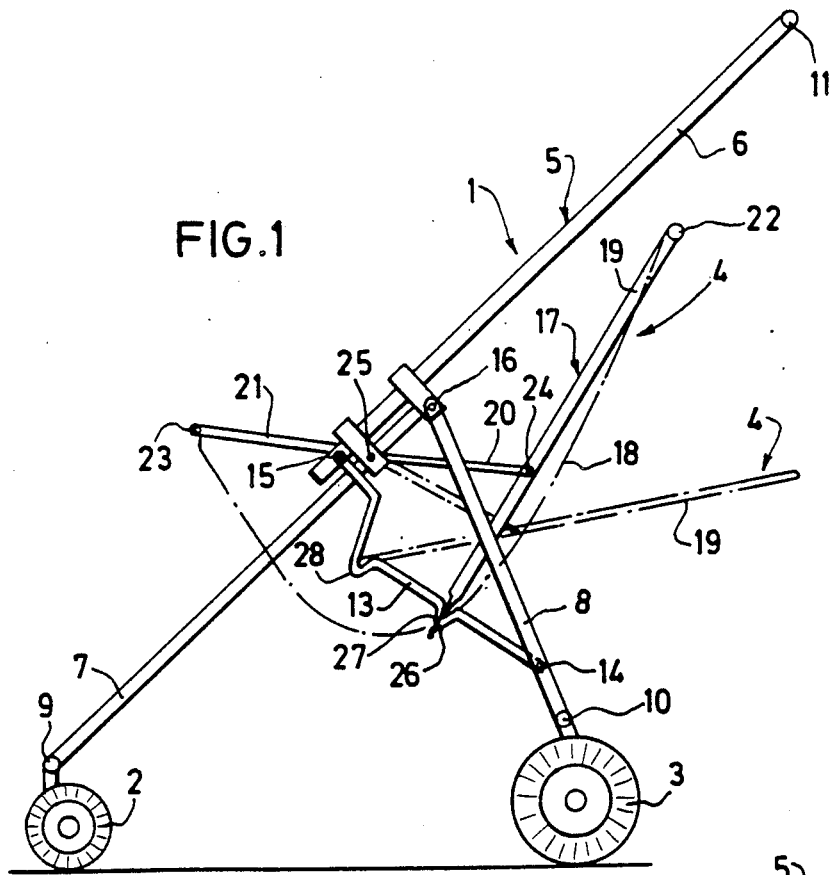
FIG. 1 is a side view of a folding pushchair in accordance with the invention and in the unfolded state.

The elements which are common to the two embodiments of FIGS. 1 to 5 will be described first.

The pushchair comprises a frame 1 which is mounted on front wheels 2 and on rear wheels 3 of either the single or double type and which supports a seat unit 4 for receiving a child.

The frame 1 is formed by two similar and preferably symmetrical lateral frame assemblies 5 which are joined to each other by means of at least one transverse bracing member which will hereinafter be described further.

Since the two frame assemblies 5 in this case are symmetrical with respect to the vertical longitudinal mid-plane of the pushchair, only one assembly will therefore be described.

Each frame assembly 5 is mainly constructed of metal tubing or of plastic material and comprises three essential elements, namely a main supporting arm 6, a front wheel-strut 7, and a rear wheel-strut 8.

In the particular application to flat-state folding pushchairs considered here by way of example, the bracing cross-member assembly is stationary and formed by two lower crossbars 9, 10 which connect respectively the lower ends of the front wheel-strut 7 and the lower ends of the rear wheel-strut 8, and by an upper crossbar 11 which connects the free upper ends of the main supporting arms 6 in order to perform the additional function of a handle-bar.

The lower ends of the front wheel-struts 7 and rear wheel-struts 8 are adapted to carry respectively the front wheels 2 and rear wheels 3.

Figure 2:
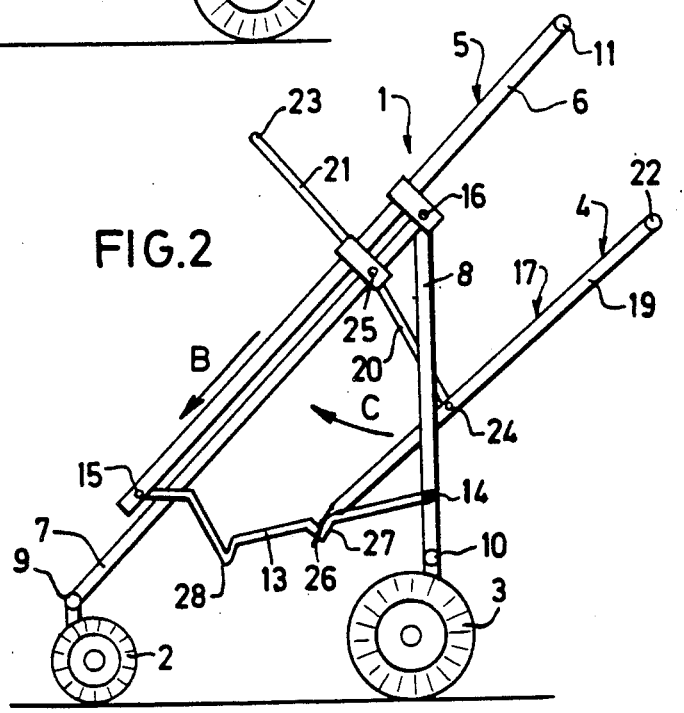
FIG. 2 is a view which is similar to FIG. 1 and shows the pushchair in the partly folded state.
Figure 4:
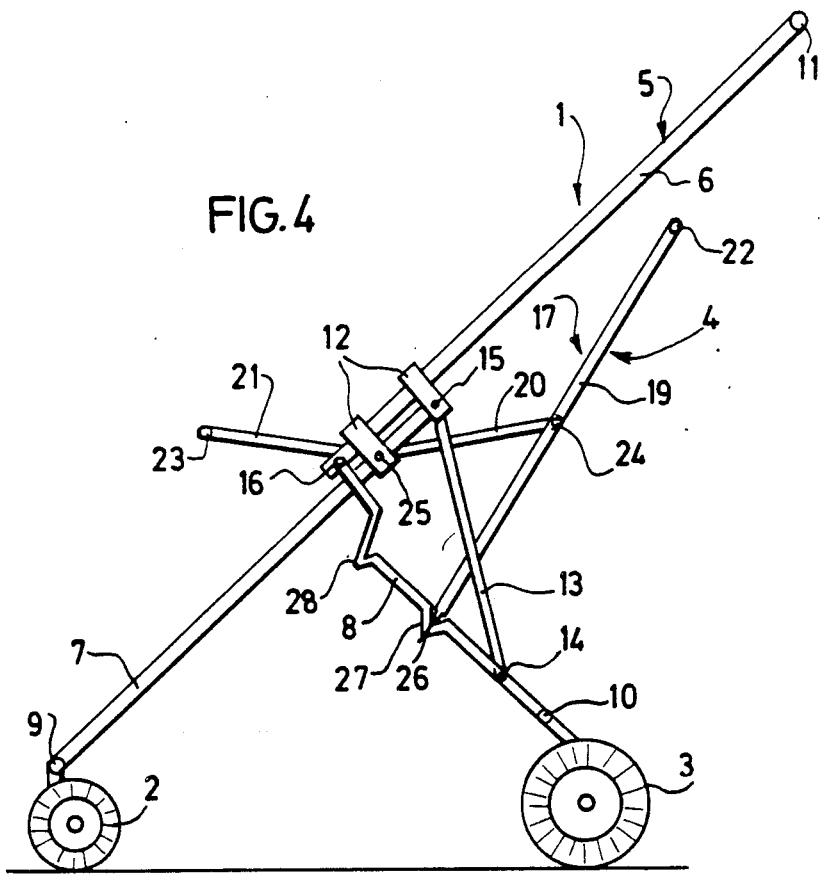
FIGS. 4 and 5 are views which are similar to FIGS. 1 and 2 respectively and relate to an alternative embodiment.
Figure 5:
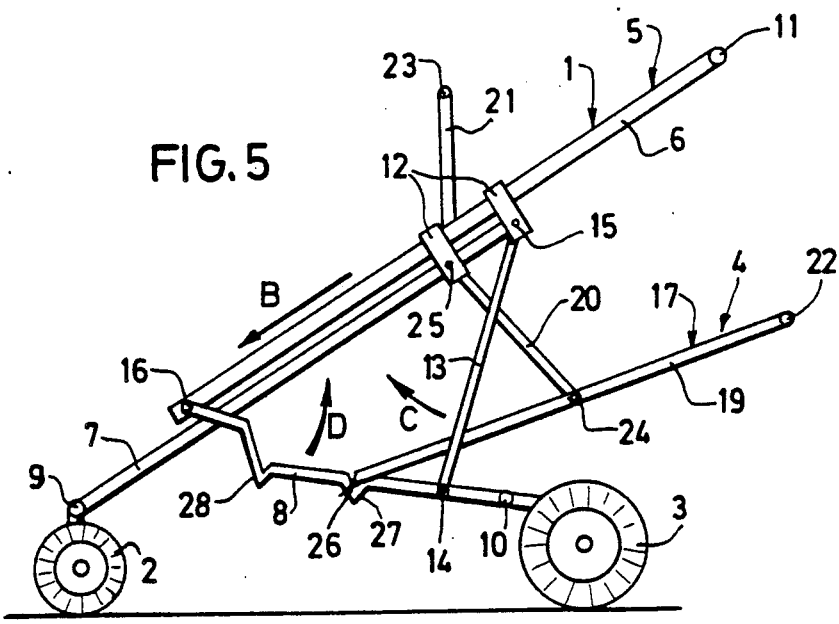

The main supporting arm 6 is and remains parallel to the front wheel-strut 7 and is adapted to cooperate with this latter in sliding motion between an outwardly expanded or unfolded position of the pushchair (as shown in FIGS. 1 and 4) and an inwardly withdrawn or folded-back position of the pushchair via intermediate positions, one of which is shown in FIGS. 2 and 5. The sliding coupling is provided by at least one sleeve 12, for example. Said sleeve is rigidly fixed to the upper end of the front wheel-strut 7 and has a bore 12a which is located in relatively displaced relation to the front wheel-strut 7 and in which the main supporting arm 6 is slidably fitted. In the example illustrated in the drawings, two spaced sleeves 12 have been adopted. By way of alternative, however, provision could be made for only one sleeve. The length of the coupling zone between the main supporting arm 6 and the front wheel-strut 7 is established in such a manner as to ensure suitable guidance in sliding motion as well as stiffness.

The rear wheel-strut 8 is coupled to the main supporting arm 6 and to the front wheel-strut 7 in such a manner as to ensure that, when said arm and strut are subjected to relative sliding movements, said rear strut 8 undergoes a displacement between an outwardly extended position (shown in FIGS. 1 and 4) in which it is in an active state and an inwardly withdrawn position in which it is folded-back against the main supporting arm 6 and the front strut 7.

The rear wheel-strut 8 is formed by an oblique side member which is associated with a stiffening link-rod 13, the primary function of said rod being to control the movements of the rear strut 8 and to maintain this latter in position.

By means of a pivot-pin 14 having a transverse axis, the lower end of the link-rod 13 is pivotally mounted on the rear wheel-strut 8 in an intermediate zone of said rear strut. By means of a pivot-pin 15 having a transverse axis, the other end of the link-rod 13 is pivotally mounted on one of the elements of the assembly formed by the main supporting arm 6 and the front wheel-strut 7. The upper end of the rear strut 8 is pivoted to the other element 6, 7 of said assembly about a pivot-pin 16 having a transverse axis.

The seat unit 4 comprises a frame 17 for supporting a hammock-type seat element 18 or the like as illustrated solely in FIG. 1, said seat element being provided with openings through which a child's legs are passed. On each side of the pushchair, the seat unit frame 17 comprises a seat-back side member 19, a connecting-rod 20 and a front side-member 21.

In the particular application considered in the foregoing, the free ends of the seat-back side members 19 as well as those of the front side-members 21 are connected together and stiffened by means of a rear crossbar 22 and a front crossbar 23. Said crossbars each define a hoop with the pair of associated side members and directly support the hammock seat 18.

The lower end of the seat-back side member 19 is swingably supported by the rear wheel-strut 8 and link-rod 13 which is pivotally attached to the lower end of the main supporting arm 6. By means of a pivot-pin 24 having a transverse axis, the rear end of the connecting-rod 20 is pivotally attached to the side member 19 in a suitable intermediate zone of this latter. The front end of the connecting-rod 20 is pivoted to the sleeve 12 about a pivot-pin 25 having a transverse axis.

In order to mount the seat-back side member 19 in such a manner as to permit displacement of this latter in swinging motion, the lower end of said side member is flattened transversely as shown at 26 and recessed in order to be engaged over the link-rod 13 (as shown in FIGS. 1 and 2) or over the rear wheel-strut (as shown in FIGS. 4 and 5) and to cooperate with a locking recess 27. The concave portion of the recess 27 is directed upwards in order to lock the seat unit in position under the action of a child's weight. The side member 19 is preferably capable of sliding on its support so as to permit adjustment of the angle of slope of the seat unit. By way of example, provision can be made for at least one locking recess 27 for adjusting the seated position and for an end locking recess 28 corresponding to the recumbent position, this position being shown in chain-dotted lines in FIG. 1.

At its rear end, the front side-member 21 is carried by the rear upper end of the front wheel-strut 7 by means of an articulation member having a transverse axis and consisting, for example, of the pivot-pin 25.

Figure 3:
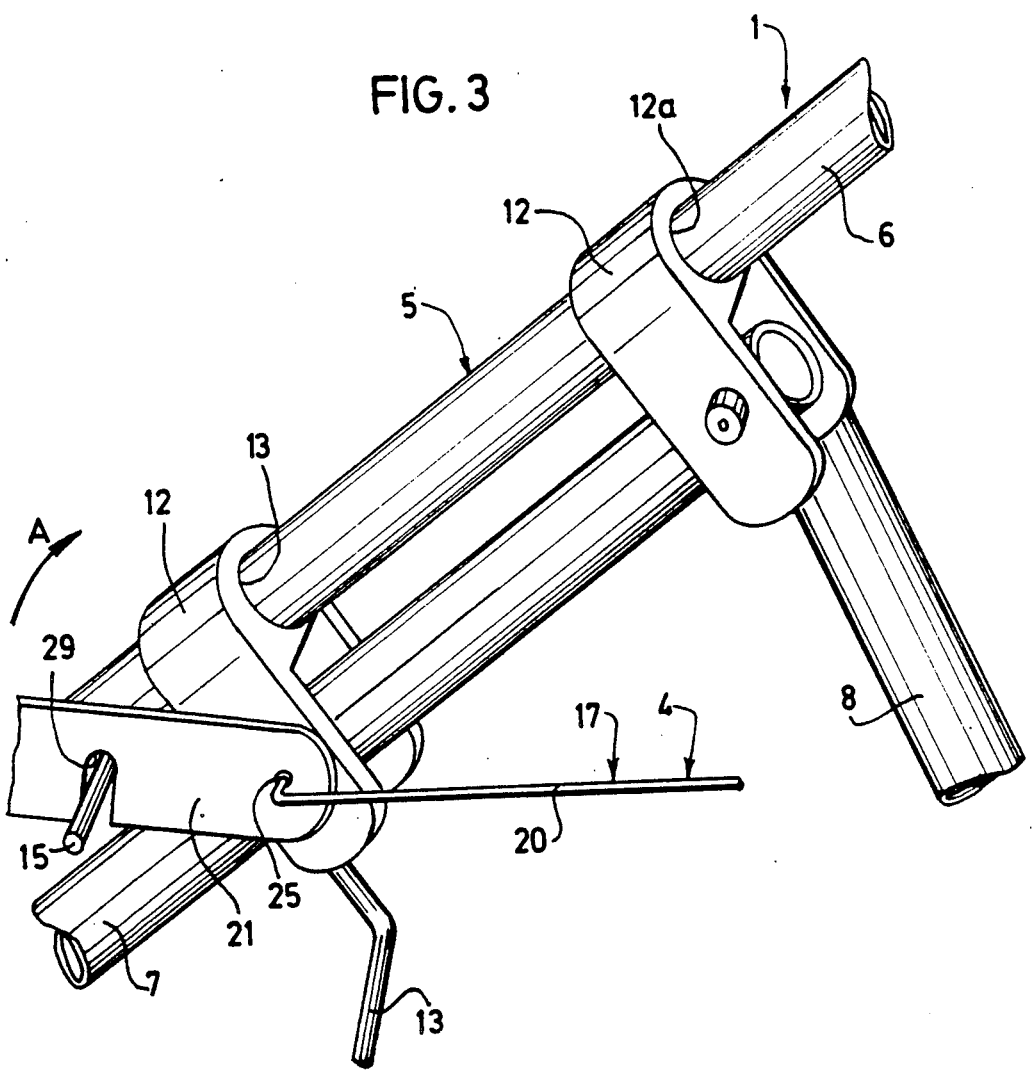
FIG. 3 is a view in perspective considered from the interior of the pushchair of FIGS. 1 and 2, and showing the sliding coupling of the main supporting arm and of the front wheel-strut as well as the cooperation of the rear wheel-strut and of the frame of the seat unit with said supporting arm and front wheel-strut.

Advantageously, the front side-member 21 has a contributory function in locking the pushchair in the unfolded position. To this end, provision is made for an elbowed notch 29 located at the lower end of said side member (as shown in FIG. 3) and at a distance from the pivot-pin 25. Said notch is adapted to cooperate with complementary locking means constituted by a transverse stud carried by the lower end of the main supporting arm 6. As shown in FIG. 3, in which the stud is formed by the bent-back end portion of the link-rod 13 forming the pivot-pin of the articulation 15, the front side-member 21 can be lowered so that its notch 29 can receive the locking stud and thus lock the pushchair in the unfolded state while being prevented from moving downwards any further under the action of a child's weight.

For the purpose of folding-back the pushchair, it is only necessary to swing the front side-member 21 upwards in the direction of the arrow A, thus releasing the locking stud and unlocking the main supporting arm 6 as well as the front wheel-strut 7.

In the particular embodiment of FIGS. 1 to 3, the seat-back side member is carried by the link-rod 13 which is provided with recesses 27, 28 and which is pivoted at 15 to the lower end of the main supporting arm 6. The rear wheel-strut 8 is pivoted at 16 to the upper end of the front wheel-strut 7, for example on the sleeve 12. In this embodiment (as shown in FIG. 2), the folding-back operation takes place in a movement of relative inward displacement of the wheels 2 and 3, the rear wheel-strut 8 being drawn forward by the link-rod 13. At the time of folding of the pushchair, the main supporting arm 6 is thrust downwards in the direction of the arrow B and is accompanied by the link-rod 13 which in turn applies a tractive force on the rear wheel-strut 8. Said strut is retained at its top end and accordingly returns to the folded position by swinging forward about the articulation point or pivot-pin 16, as shown by the arrow C. At the same time, the link-rod 13 applies a downwardly and forwardly directed tractive force on the seat-back side member 19 which accordingly tilts forward with respect to the link-rod and is guided by the connecting-rod 20 so as to fold back against the front wheel-strut 7.

In the particular embodiment of FIGS. 4 and 5, the seat-back side member 19 is carried by the rear wheel-strut 8 which is provided with recesses 27, 28 and which is pivotally attached at 16 to the lower end of the main supporting arm 6 and the link-rod 13 is pivotally attached at 15 to the upper end of the front wheel-strut 7, for example to the sleeve 12. In this embodiment, and as shown in FIG. 5, folding of the pushchair takes place without relative inward displacement of the wheels 2, 3, a tractive force being applied by the main supporting arm 6 on the upper end of the rear wheel-strut 8 whilst the rear portion of said strut is retained by the link-rod 13 which swings forward about its articulation point or pivot-pin 15 in the direction of the arrow C. At the time of folding of the pushchair, the arm 6 is thrust downwards in the direction of the arrow B as in the previous embodiment; the rear wheel-strut 8 thus swings back in the rearward direction about its movable pivot-pin 16, as shown by the arrow D. At the same time, the rear wheel-strut 8 applies a forwardly and downwardly directed tractive force on the seat-back side member 19, thereby displacing said side member in a swinging movement with respect to said wheel-strut and causing it to fold-back against the front wheel-strut 7 while being guided by the connecting-rod 20.

In both of the embodiments described in the foregoing, the hoop formed by the side members 21 and the crossbar 23 constitutes a bearing and reaction means for the folding and unfolding operations. For the purpose of storing the pushchair in the flat state, the hoop can be swung back in the plane of the main supporting arm and of the front wheel-strut.

After unlocking of the pushchair, the folding operation is performed simply by exerting a thrust on the handle-bar 11 and a tractive effort on the crossbar 23. Opening-out or unfolding of the pushchair is carried out by exerting a tractive effort on the handle-bar 11 and a thrust on the crossbar 23 but it may prove sufficient for the user to exert a sharp pull on the handle-bar 11 in order to cause unfolding of the pushchair by inertia.

What is claimed is:

1. A child's folding pushchair, comprising two lateral frame assemblies transversely connected to each other by means of at least one bracing crossbar, each lateral frame assembly having a first element formed of a main supporting arm whose lower front portion supports a second element of said assembly formed by a front strut carrying at least one front wheel or the like, a third element of said assembly formed by a rear strut carrying at least one rear wheel or the like, the first and second elements being slidably coupled to each other and the third element being pivotally attached at its upper end to one of said first and second elements, and a fourth element of said assembly formed by a stiffening link-rod the ends of which are pivotally connected to the third element and to the other one of said first and second elements respectively, and a seat unit carried by each lateral frame assembly, the lateral frame assemblies being foldably collapsible by relative retraction of said first and second elements in sliding relationship and by causing the third element to rotate towards said first and second elements due to the drawing action of said fourth element, wherein the seat unit comprises a frame provided on each lateral side with a seat-back lateral chassis member pivotally supported on one of said third and fourth elements and pivotally connected to an end of a connecting-rod having another end pivotally connected to one of said first and second elements, whereby for folding of the pushchair, when said first and second elements relatively retract in sliding motion and said third element is rotatable towards said first and second elements under the drawing action applied by said fourth element, said seat-back lateral chassis member and said connecting-rod also move to the folded position.

2. A pushchair according to claim 1, wherein the lower end of the seat-back lateral chassis member is also slidably received by one of said third and fourth elements so as to permit adjustment of the angular position of the seat unit.

3. A pushchair according to claim 2, wherein said stiffening link rod comprises at least two recesses for supporting the lower end of the seat-back lateral chassis member, said lower end being transversely flattened.

4. A pushchair according to any one of claims 1 to 3, wherein the frame of the seat unit comprises a front side-member which extends in front of said lateral frame assemblies and which is pivotally connected at its rear end to the upper end of said second element.

5. A pushchair according to claim 4, wherein the front side-member is provided with locking means adapted to cooperate with complementary locking means carried by said first element for locking said lateral frame assemblies in the unfolded position, said locking means being released by displacement of the front side-member in a swinging movement in the upward direction for the purpose of folding said pushchair.

6. A pushchair according to claim 5, wherein the locking means are constituted by a notch formed in the bottom edge of the front side-member at a predetermined distance from its axis of articulation and by a transverse stud carried by the upper end of said second element adapted to be received by said notch in the unfolded position of the pushchair.

7. A pushchair according to claim 5, wherein the seat-back lateral chassis members and the front side-members of said lateral frame assemblies are connected at the free ends thereof respectively by means of a rear crossbar and a front crossbar, each crossbar together with the pair of associated seat-back lateral chassis members being intended to form a hoop for supporting the seat element.

8. A pushchair according to claim 1 wherein the seat frame is adapted to carry a hammock-type element having two openings through which a child's legs are intended to pass.

9. A pushchair according to claim 1, wherein the lower end of the seat-back lateral chassis member is carried by said fourth element the upper end of which is pivotally connected to the lower end of said first element, and the upper end of said third element is pivotally connected to the upper end of said second element, whereby the folding operation takes place with a displacement of the front and rear wheels towards each other.

10. A pushchair according to claim 1, wherein the lower end of the seat-back lateral chassis member is carried by said third element the front upper end of which is pivotally connected to the lower end of said first element, and the upper end of said fourth element is pivotally connected to the upper and of said second element, whereby the folding operation takes place with a displacement of the front and rear wheels away from one another.

* * * * *

UNITED STATES PATENT AND TRADEMARK OFFICE
CERTIFICATE OF CORRECTION

PATENT NO. : 4,681,340

DATED : July 21, 1987

INVENTOR(S) : Henri PASQUINI

It is certified that error appears in the above-identified patent and that said Letters Patent is hereby corrected as shown below:

At column 1, line 39, insert ---a--- between "and" and "front".

At column 4, line 1, insert ---a--- between "however" and "provision".

At column 4, line 67, insert---a--- between "example" and "provision".

At column 5, line 9, insert ---a--- between "end" and "provision".

Signed and Sealed this

Third Day of January, 1989

Attest:

DONALD J. QUIGG

Attesting Officer

Commissioner of Patents and Trademarks